US009956946B2

(12) United States Patent
Leroy et al.

(10) Patent No.: US 9,956,946 B2
(45) Date of Patent: May 1, 2018

(54) METHOD FOR CLEANING A VALVE

(71) Applicant: Ford Global Technologies, LLC, Dearborn, MI (US)

(72) Inventors: Tom Leroy, Dagenham (GB); Brian David Eves, Basildon (GB); Andy Staughton, Chafford Hundred (GB)

(73) Assignee: Ford Global Technologies, LLC, Dearborn, MI (US)

( * ) Notice: Subject to any disclaimer, the term of this patent is extended or adjusted under 35 U.S.C. 154(b) by 117 days.

(21) Appl. No.: 14/996,492

(22) Filed: Jan. 15, 2016

(65) Prior Publication Data
US 2016/0214592 A1 Jul. 28, 2016

(30) Foreign Application Priority Data
Jan. 27, 2015 (GB) .................................. 1501281.8

(51) Int. Cl.
*B60T 17/22* (2006.01)
*F02D 41/00* (2006.01)
*B60T 13/52* (2006.01)
*B60T 17/02* (2006.01)

(52) U.S. Cl.
CPC .............. *B60T 17/22* (2013.01); *B60T 13/52* (2013.01); *B60T 17/02* (2013.01); *F02D 41/0002* (2013.01); *F02D 2250/41* (2013.01); *Y02T 10/42* (2013.01)

(58) Field of Classification Search
CPC .......... B60T 17/22; B60T 17/02; B60T 13/52; F02D 41/0002; F02D 2250/41; F02D 2700/0225; F02D 2700/02; F02D 41/0052; F02D 33/00; Y02T 10/42; Y02T 10/52; F02B 19/1052

USPC ......................................................... 701/103
See application file for complete search history.

(56) References Cited

U.S. PATENT DOCUMENTS

| 2013/0000752 A1 | 1/2013 | Saito et al. |
| 2015/0047345 A1 | 2/2015 | Eves et al. |
| 2015/0083094 A1* | 3/2015 | Pursifull ................ F02D 23/00 123/559.1 |

(Continued)

FOREIGN PATENT DOCUMENTS

| GB | 2517166 A | 2/2015 |
| KR | 20070063875 A | 6/2007 |
| WO | 2007093917 A2 | 8/2007 |

OTHER PUBLICATIONS

Intellectual Property Office, Combined Search and Examination Report of GB1501281.8, dated Jun. 24, 2015, United Kingdom, 6 pages.

*Primary Examiner* — Joseph Dallo
*Assistant Examiner* — Scott A Reinbold
(74) *Attorney, Agent, or Firm* — Greg Brown; McCoy Russell LLP

(57) ABSTRACT

A method and system for cleaning a brake booster aspirator shut-off valve are provided. The shut-off valve is operable to selectively permit flow of intake air through an aspirator; the aspirator bypasses a throttle of an engine and provides a vacuum source for a brake booster. The method comprises determining whether the shut-off valve may require cleaning, opening the shut-off valve so as to permit a flow of air through the shut-off valve and clean the shut-off valve and adjusting the throttle position of the engine to compensate for the additional flow of intake air through the aspirator.

20 Claims, 3 Drawing Sheets

(56) References Cited

U.S. PATENT DOCUMENTS

2015/0144098 A1* 5/2015 Worthing ............ F02D 41/0002
123/337

* cited by examiner

METHOD FOR CLEANING A VALVE

CROSS-REFERENCE TO RELATED APPLICATION

The present application claims priority to Great Britain Patent Application No. 1501281.8, filed Jan. 27, 2015, the entire contents of which are hereby incorporated by reference for all purposes.

FIELD

The present disclosure relates to a method for cleaning a valve within the air intake system of a motor vehicle and is particularly, although not exclusively, concerned with a method for cleaning a super aspirator shut off valve.

BACKGROUND/SUMMARY

Most modern vehicles are fitted with a brake booster which uses a vacuum chamber to increase the braking force supplied from the brake pedal to the brake master cylinder. The brake booster prevents the brake pedal from feeling heavy to the driver.

The brake booster requires a source of vacuum pressure in order to operate, which, in naturally aspirated engines, is often delivered exclusively by the inlet manifold. In some circumstances the vacuum supplied by the inlet manifold may be insufficient. This may be due to a large amount of torque being supplied by the engine, either for mechanical drive or to power auxiliary electrical systems in the vehicle. In this case the inlet throttle may be fully open and hence inlet manifold vacuum may be low.

In order to maintain the brake booster vacuum under conditions of low inlet manifold vacuum, an additional vacuum source may be used, such as a super aspirator. A super aspirator may take the form of a venturi duct connected between the intake duct and inlet manifold across the inlet throttle, e.g. bypassing the inlet throttle. The pressure difference across the throttle drives a flow through the venturi allowing a lower pressure to be generated within the venturi. This can in turn be used to provide a lower pressure (higher vacuum) in the brake booster vacuum chamber than could be supplied by the inlet manifold.

A shut-off valve may control the operation of the super aspirator, e.g. by selectively permitting flow to the super aspirator. The shut-off valve may be opened when insufficient vacuum is present in the brake booster and/or inlet manifold. The shut-off valve may be controlled by the engine's power-train control module and may normally be in a closed position unless activated.

If the super aspirator is not required for long periods of time and hence the shut-off valve remains closed, contaminants within the air such as oil, dirt, fuel or other deposits may build up on the shut-off valve and impair its performance or prevent it opening when the super aspirator is required.

According to an aspect of the present disclosure, there is provided a method of cleaning a brake booster aspirator shut-off valve, the shut-off valve being operable to selectively permit flow of intake air through an aspirator, the aspirator bypassing a throttle of an engine and providing a vacuum source for a brake booster, wherein the method comprises: determining whether the shut-off valve may require cleaning; and at least partially opening the shut-off valve so as to permit a flow of air through the shut-off valve and clean the shut-off valve. The method may further comprise adjusting the throttle position of the engine to compensate for the additional flow of intake air through the aspirator.

The method may further comprise shutting the shut-off valve and returning the throttle to its unadjusted position. The opening and closing of the shut-off valve, together with the corresponding adjustments to the throttle position may be repeated, e.g. immediately repeated in a particular cleaning cycle, e.g. a predetermined number of times.

The throttle position may be adjusted to compensate for the additional flow of intake air through the aspirator in order to maintain a constant inlet manifold pressure. Additionally or alternatively, the throttle position may be adjusted to compensate for the additional flow of intake air through the aspirator in order to maintain a constant engine torque.

The method may further comprise: determining whether a possible change in throttle position can compensate for the additional flow of intake air through the aspirator. If a change in throttle position cannot compensate for the additional flow of intake air through the aspirator, cleaning of the shut-off valve may be delayed, e.g. for a set period of time or until the throttle position can compensate for the additional flow of intake air. Additionally or alternatively, the throttle position may be monitored and the shut-off valve may be cleaned when a change in throttle position can compensate for the additional flow of intake air through the aspirator.

The method may further comprise: determining whether the engine speed and/or torque is within a range in which cleaning of the shut-off valve is permitted. Cleaning of the shut-off valve may only be permitted if engine conditions are suitable. If the engine speed and/or torque is not within a range in which cleaning of the shut-off valve is permitted, cleaning of the shut-off valve may be delayed, e.g., for a set period of time. Additionally or alternatively, the engine speed and/or torque may be monitored, and the shut-off valve may be cleaned when the engine speed and/or torque is suitable.

Determining whether the shut-off valve may require cleaning may comprise determining an interval of: engine running time; engine revolutions; and/or engine or vehicle mileage; since the shut-off valve was previously opened and comparing the result to a predetermined threshold value. Additionally or alternatively, determining whether the shut-off valve may require cleaning may comprise determining an interval of time since the shut-off valve was previously cleaned and comparing the result to a predetermined threshold value. Again additionally or alternatively, determining whether the shut-off valve may require cleaning may comprise: sensing whether contaminants have built up within the aspirator shut-off valve. According to another aspect of the present disclosure, there is provided a method of cleaning a throttle, the throttle being operable to selectively permit flow of intake air into an inlet manifold of an engine, wherein the method comprises: determining whether the throttle may require cleaning; adjusting the position of the throttle so as to disturb any contaminants which have settled on the throttle; and adjusting the position of a super aspirator shut-off valve to compensate for the change in flow of intake air through the throttle, the super aspirator shut-off valve selectively permitting the flow of intake air through an aspirator bypassing the throttle.

According to another aspect of the present disclosure, there is provided a system for cleaning a brake booster aspirator shut-off valve or a throttle of an engine, the shut-off valve being operable to selectively permit flow of intake air through an aspirator, the aspirator bypassing the throttle of the engine and providing a vacuum source for a brake booster, wherein the system comprises one or more controllers, including executable instructions stored in memory, configured to perform the method according to any of the previously mentioned aspects of the disclosure.

The system may further comprise one or more sensors configured to sense whether contaminants have built up within the brake booster aspirator shut-off valve and/or throttle.

According to another aspect of the present invention, there is provided software, which when executed by a computing apparatus causes the computing apparatus to perform the method according to any of the previously mentioned aspects of the disclosure.

According to another aspect of the present invention, there is provided a vehicle or engine comprising the system for cleaning a brake booster aspirator shut-off valve or throttle of an engine according to any of the previously mentioned aspects of the disclosure.

BRIEF DESCRIPTION OF THE DRAWINGS

For a better understanding of the present disclosure, and to show more clearly how it may be carried into effect, reference will now be made, by way of example, to the accompanying drawings, in which.

DETAILED DESCRIPTION

Figure 1:
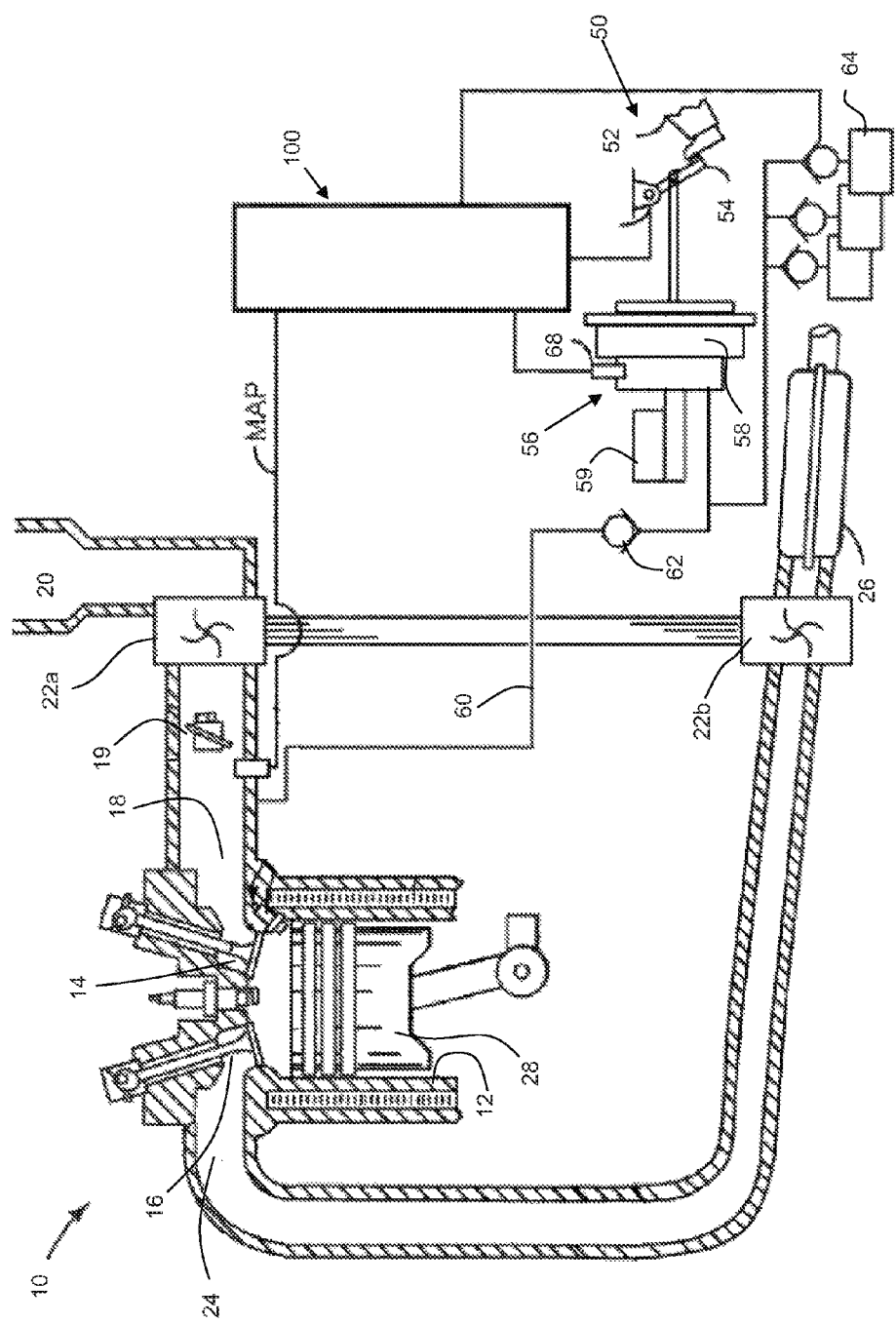
FIG. 1 is a schematic diagram of an engine, a controller and a brake assembly of a vehicle fitted with a brake booster.

With reference to FIG. 1, a typical motor vehicle including a brake booster is described. The vehicle may comprise an engine 10 and a brake assembly 50.

The engine 10 may comprise a plurality of cylinders 12 and corresponding pistons 28. Air flow into and out of each of the cylinders 12 may be controlled through the use of inlet and outlet valves 14, 16 respectively.

The engine 10 may comprise an inlet 20 which allows air to be drawn into the engine. The engine 10 may further comprise a turbocharger 22. Typically, the turbocharger 22 comprises a compressor 22a which is arranged with an exhaust driven turbine 22b driving the compressor 22a on the same shaft. The turbocharger 22 may improve the engine power output and emissions. Air may enter the engine 10 through inlet 20 and be passed through the compressor 22a. Air which has been compressed by the turbocharger compressor 22a may be throttled by an inlet throttle 19 before being delivered to an inlet manifold 18.

Due to the presence of the inlet throttle valve 19, and also through the action of the engine pistons 28 drawing air from the inlet manifold into the engine cylinders 12, the inlet manifold 18 may be at a lower pressure than air entering via the inlet 20, i.e. there may be a vacuum present within the inlet manifold 18. The level of manifold vacuum may be reduced as the throttle is opened, and/or power is supplied to the turbocharger compressor 22a from the turbocharger turbine 22b, boosting the pressure of the inlet air.

The inlet manifold 18 may be disposed about the inlet valves 14, such that air within the inlet manifold 18 may be drawn into the cylinders 12 when each of their respective inlet valves 14 is open. In the cylinders 12, fuel is mixed with the air and combusted.

Combustion gases are exhausted from the cylinders 12 via outlet valves 16 into an exhaust manifold 24. Exhaust gases within the manifold 24 may then pass though the turbocharger turbine 22b before being exhausted through an exhaust pipe 26.

The brake assembly 50 may comprise a brake pedal 54, a brake booster 56 and a brake master cylinder 59. The brake booster 56 may be configured to amplify the force provided by a foot 52 on the brake pedal 54.

Amplification of the applied braking force may be achieved through the use of a negatively pressurized brake booster chamber 58 provided within the brake booster 56. A diaphragm (not shown) may be provided within the brake booster chamber 58. When the brake pedal 54 is pushed by a driver, the diaphragm may be exposed to atmospheric air on one side, whilst the other side of the diaphragm may be exposed to the vacuum pressure within the brake booster chamber. The pressure difference across the diaphragm may be used to provide additional braking force to the brake master cylinder 59.

Using a brake booster to amplify the supplied braking force in this way has the effect of a lighter feeling brake pedal, as the driver need not push as hard to achieve the desired level of braking.

The brake booster chamber 58 may be connected via a vacuum line 60 to the inlet manifold 18 and may thereby be charged with vacuum pressure from the inlet manifold. A check valve 62 may be provided in the vacuum line 60 to ensure the flow is from the brake booster chamber 58 to the inlet manifold 18 only. This allows vacuum pressure in the brake booster chamber 58 to be maintained through conditions when inlet manifold vacuum is low.

When the turbocharger 22 is operating, and/or the inlet throttle 19 is open, the inlet manifold pressure may be close to or above atmospheric levels and hence an additional vacuum source 64 may be provided for the brake booster 56. In FIG. 1, the additional vacuum source comprises an electrically driven vacuum pump.

Figure 2:
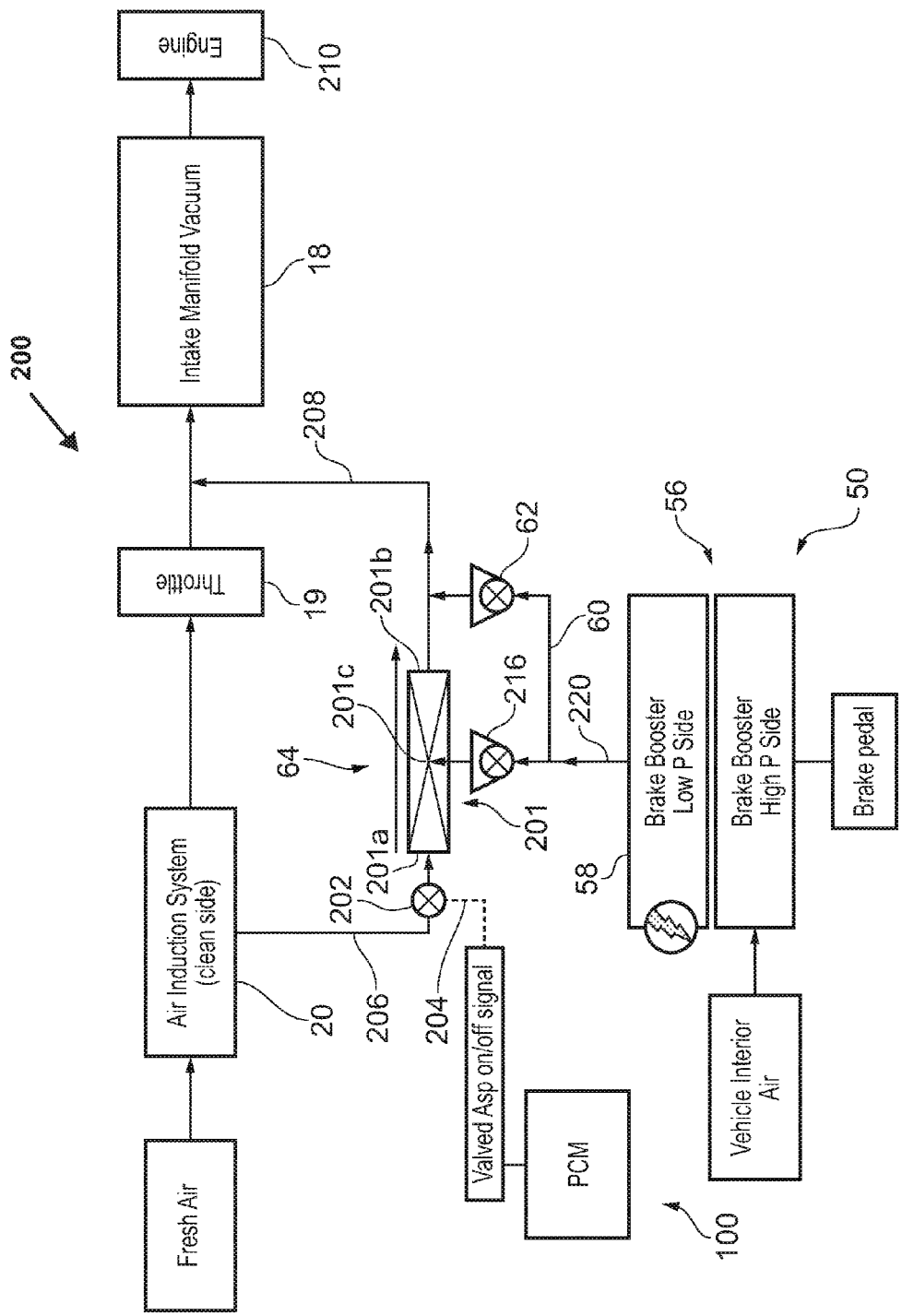
FIG. 2 is a schematic view of a brake booster assembly for a vehicle according to an example of the present disclosure.

With reference now to FIG. 2, the vehicle may comprise an engine 210, a super aspirator 201 and a system 200 according to an example of the present disclosure. In the example shown in FIG. 2, the engine 210 comprises a naturally aspirated petrol engine, however it is equally envisaged that the present disclosure could apply to a diesel engine. Additionally or alternatively, the engine could comprise a turbocharger or supercharger. In some embodiments, the vehicle may additionally comprise an electric motor and the engine 210 may be part of a hybrid drive system.

The naturally aspirated engine 210 shown in FIG. 2 also comprises the inlet 20, the throttle 19 and the intake manifold 18 described above.

In the example shown in FIG. 2, the additional vacuum source 64 comprises the super aspirator 201. The super aspirator is a venturi device and comprises an inlet side 201a, an outlet side 201b and a narrowing or throat 201c therebetween. The inlet side 201a is connected to the inlet 20 of the engine 210 via inlet line 206. An outlet line 208 connects the outlet side 201b to the inlet manifold 18 of the engine 210.

As described above, when the engine 210 is operating, there may be a reduced pressure within the inlet manifold 18 relative to the inlet 20. Air may therefore be drawn through the super aspirator from the higher pressure inlet 20 to the lower pressure inlet manifold 18. When a flow of air is present through the super aspirator, the pressure within the venturi of the super aspirator 201 may be lower than at either the inlet side 201*a* or the outlet side 201*b*.

A vacuum pipe 220 may be connected to the super aspirator 201, e.g. at the throat 201*c*, between the inlet end 201*a* and the outlet end 201*b*. The vacuum pipe may be in fluidic communication with the flow through the super aspirator venturi. The vacuum pipe 220 may be connected at the location where the pressure in the venturi is lowest.

The vacuum pipe 220 may also be connected (directly or indirectly) to the brake booster chamber 58. When the super aspirator is operating, the brake booster chamber may thus be charged with a higher level of vacuum than the inlet manifold 18. A super aspirator check valve 216 may be provided between the brake booster 56 and the super aspirator 201 to allow the vacuum to be retained within brake booster 56 when the super aspirator 201 is not operating.

Operation of the super aspirator may be controlled by a shut-off valve 202. The shut off valve may comprise a ball valve, or a butterfly valve, or any other valve capable of selectively permitting flow through the super aspirator. The shut-off valve may be positioned within the super aspirator and may be positioned at the inlet or the outlet of the super aspirator. Alternatively, the shut-off valve may be positioned between the inlet and the outlet of the super aspirator, for example at the throat 201*c*. Alternatively, the shut-off valve may be positioned upstream of the super aspirator, e.g. on the inlet line 206 or downstream of the super aspirator, e.g. on the outlet line 208. The shut-off valve 202 may close to prevent the flow of air through the super aspirator when additional vacuum is not required. For example, when a sufficient level of vacuum is available from the inlet manifold 18 and the super aspirator is not required.

When the additional vacuum source 64 comprises the super aspirator 201, as shown in FIG. 2, the vacuum line 60 may still be provided to enable the brake booster chamber 56 to be charged with vacuum pressure from the inlet manifold when desirable, i.e. when a sufficient level of vacuum is available from the inlet manifold 18. If the vacuum line 60 is provided, the check valve 62 may also be provided as described above.

The shut-off valve 202 may be exposed to contaminants present in the air from the inlet 20 and the inlet manifold 18 as well as in the air which is drawn from the brake booster chamber 58. This air may contain traces of oil, dirt, fuel or other particles which may settle on the shut-off valve and may build up as a deposit on the valve. Exposure to contaminants may occur even when the shut-off valve 202 is closed.

In some vehicle configurations and driving conditions, the shut-off valve 202 may be opened regularly which may dislodge any built up contaminants. Dislodged contaminants may be drawn into the engine 210 and combusted.

In some circumstances, the shut-off valve 202 may remain closed for long periods, for example if the engine 210 is configured such that the inlet manifold vacuum remains high during normal operation, and/or the brakes are not regularly operated. In these cases, contaminants may not be regularly removed from the shut-off valve 202.

If contaminants are allowed to build up on the shut-off valve 202, the performance of the shut-off valve may be affected. In some cases, the build up of contaminants may lead to the shut-off valve being completely blocked, or unable to open, such that the super aspirator 201 can no longer be used to provide a vacuum source for the brake booster 56.

Figure 3:
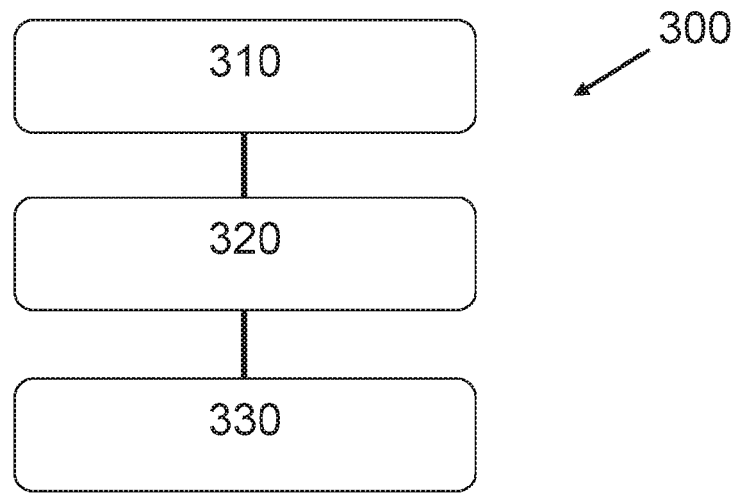
FIG. 3 shows a method of cleaning a super aspirator shut-off valve according to an example of the present disclosure.

With reference to FIG. 3, in order to prevent a loss of performance of the shut-off valve 202, a monitoring and cleaning process 300 according to the present disclosure may be carried out. The process 300 may comprise a first step 310, which determines whether the shut-off valve may require cleaning; a second step 320, which performs a cleaning cycle on the shut-off valve; and a third step 330, which adjusts the position of the throttle 19 of the engine 210 to compensate for the change in flow through the super aspirator 201, which by-passes the throttle 19, during the cleaning cycle. The second and third steps 320, 330 may occur substantially at the same time.

Figure 4:
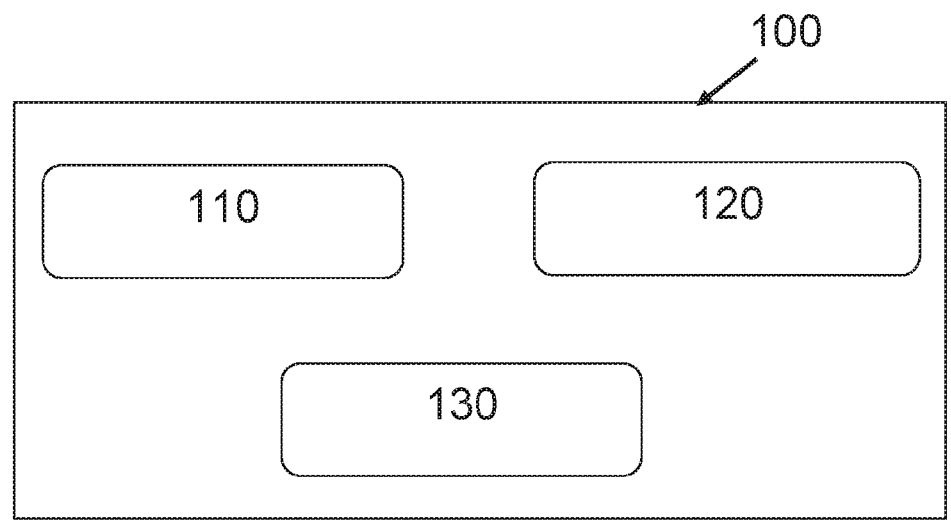
FIG. 4 shows a system of cleaning a super aspirator shut-off valve according to an example of the present disclosure.

Referring to FIG. 4, a system according to the present disclosure may comprise one or more controllers 100 comprising a first module 110 configured to determine whether the super aspirator shut off valve 202 may require cleaning; a second module 120 configured to perform the shut-off valve cleaning cycle; and a third module 130 configured to adjust the throttle 19 to compensate for the change in flow through the super aspirator 201.

During a valve cleaning cycle in step 320, the shut-off valve may be opened and shut a number of times, which may allow air to flow through the shut-off valve and may dislodge and remove any contaminants from the valve. The number of times the valve is opened may be 5, 10, 20 or more times. The number of times the valve is opened may be configured, for example the number of times the valve is opened may be set according to the predicted amount of contaminant build up. The time period the shut-off valve is open and the time period the shut-off valve is closed may be calibrated to maximize contaminant removal. Additionally or alternatively other considerations may be used.

The shut-off valve may open and close rapidly. Furthermore, when opening or closing the shut-off valve during cleaning, the rate of movement of the shut-off valve may be greater than during normal operation. This may help to dislodge any contaminants on the shut-off valve. Additionally or alternatively to opening and closing the shut-off valve, the shut-off valve may be opened, partially or fully, for a set period of time to allow a flow of air over the valve to carry away any dislodged contaminants. When the shut-off valve is partially opened, the velocity of the air flowing through the shut-off valve may be higher than when the shut-off valve is fully open. The flow of air through the partially opened shut-off valve may therefore be more likely to dislodge and/or carry away any contaminants present. The period over which the valve is opened may be set according the predicted amount of contaminant build up.

When the super aspirator 201 is operating, a portion of the inlet air passes through the super aspirator rather than through the inlet throttle 19 and hence more air may be allowed to flow from the inlet 20 to the inlet manifold 18 than would usually flow past the throttle 19 if the super aspirator was not operating. To compensate for the fluctuations in air flow to the inlet manifold 18 during a shut-off valve cleaning cycle, in step 330 the controller 100 may close, e.g., partially or fully, the inlet throttle 19 at the same time as opening the shut-off valve 202, in order to maintain substantially the same flow of air into the inlet manifold 18.

The controller 100 may refer to a stored look-up table to determine how much adjustment of the throttle is required to compensate for the flow through the super aspirator 201. Alternatively or additionally, the adjustment of the throttle may be determined by the current running conditions of the engine 210. For example, a sensor may measure the engine torque output, which may be used to determine the throttle adjustment necessary. Additionally or alternatively, the controller 100 may act to maintain an engine parameter such as manifold air pressure during shut-off valve cleaning, for example using a feedback loop. In this way the controller 100 may be configured to clean the shut-off valve in a way which is undetectable to the driver.

The controller 100 may be configured not to trigger a cleaning cycle when the engine is running within a certain speed range and/or when the engine is providing a certain torque. For example, when the engine is running at low speed or is only lightly loaded, the throttle may only be slightly open. Under these conditions, it may not be possible to adequately compensate for the increased air flow to the inlet manifold by closing the throttle. In this case, cleaning of the shut-off valve may be delayed, e.g. for a set period of time. Additionally or alternatively, the controller may continue to monitor the engine speed and/or torque, and a cleaning cycle may be initiated when the engine speed and/or torque is at an appropriate level.

To determine whether the super aspirator shut-off valve may require cleaning, the performance of one or more of the super aspirator, the brake booster, the brake system and the engine may be monitored. For example, if the performance is below a predetermined performance threshold, it may be determined that the super aspirator shut-off valve may require cleaning.

In order to determine the performance of the shut-off valve, the controller 100 may consider the rate at which the pressure of the brake booster vacuum chamber changes when the shut-off valve is opened, and/or the time taken to reach a desired vacuum level. Additionally or alternatively, the controller 100 may compare the maximum vacuum level achieved to an expected value.

Alternatively or additionally, the controller 100 may be configured to determine whether a cleaning cycle is required by recording the interval between shut-off valve openings. The interval may be measured with respect to engine running time, engine or vehicle mileage, or revolutions of the engine 210. If the interval between shut-off valve openings exceeds a pre-determined threshold value, the controller 100 may initiate a valve cleaning cycle.

Alternatively or additionally, the controller 100 may trigger a cleaning cycle at periodic intervals regardless of how frequently the super aspirator is switched on. Accordingly, the length of time since the shut-off valve has undergone a cleaning cycle may be calculated and stored.

It will be appreciated that when it is determined that the shut-off valve may require cleaning, the shut-off valve may not actually require cleaning. The shut-off valve may be cleaned as a precaution, for example to ensure the shut-off valve will be able to open when required by the brake system and will not restrict air flow through the super aspirator undesirably.

Alternatively, or as a further way of determining that the shut-off valve requires cleaning, one or more sensors may be provided to sense whether contaminants have built up within the shut-off valve. The shut-off valve may then be cleaned when a build up of contaminants is detected.

As another example, the movement of the throttle valve may be based on a determination that the cleaning is about to be initiated, but before the shut-off valve is actually opened (and or repeatedly opened/closed) for cleaning. For example, the throttle may be closed immediately before, but still before, movement of the shut-off valve to compensate for airflow and/or pressure change delays in the air induction system so that the airflow may be controlled accurately at the engine cylinders. Further, spark timing adjustments or fuel injection timing adjustments may also be coordinated with the early throttle movement to decrease any remaining airflow/aircharge errors at the cylinders. For example, the pre-movement of the throttle may be based on anticipated movement estimated for the shut-off valve, but based upon actual movement and/or actual airflow measurements, further adjustments to the throttle may be too slow, and thus adjustments to spark timing may be used to compensate for such transient errors.

Although the description above has been made with reference to the shut-off valve being cleaned and the throttle being adjusted to compensate for the change in flow through the super aspirator, it is equally possible that the method of the present disclosure could be applied to cleaning the throttle by varying the position of the throttle and controlling the shut-off valve to compensate for the change in flow through the throttle. Therefore, features described with respect to the shut-off valve may also apply to the throttle.

It will be appreciated by those skilled in the art that although the invention has been described by way of example, with reference to one or more examples, it is not limited to the disclosed examples and that alternative examples could be constructed without departing from the scope of the invention as defined by the appended claims.

The invention claimed is:

1. A method of cleaning a brake booster aspirator shut-off valve, the shut-off valve being operable to selectively permit flow of intake air through an aspirator, the aspirator bypassing a throttle of an engine and providing a vacuum source for a brake booster, wherein the method comprises:
   determining whether the shut-off valve requires cleaning;
   at least partially opening the shut-off valve so as to permit a flow of air through the shut-off valve and clean the shut-off valve; and
   adjusting the throttle position of the engine to compensate for additional flow of intake air through the aspirator.

2. The method according to claim 1, further comprising shutting the shut-off valve and returning the throttle to its unadjusted position.

3. The method according to claim 2, wherein the opening and shutting of the shut-off valve, together with the corresponding adjustment to the throttle position, is repeated.

4. The method according to claim 1, wherein the throttle position is adjusted to compensate for the additional flow of intake air through the aspirator in order to maintain a constant inlet manifold pressure.

5. The method according to claim 1, wherein the throttle position is adjusted to compensate for the additional flow of intake air through the aspirator in order to maintain a constant engine torque.

6. The method according to claim 1, wherein the method further comprises:
   determining whether a possible change in throttle position can compensate for the additional flow of intake air through the aspirator.

7. The method according to claim 1, further comprising:
   determining whether an engine speed and/or torque is within a range in which cleaning of the shut-off valve is permitted.

8. The method according to claim 1, wherein determining whether the shut-off valve requires cleaning comprises:
   determining an interval of:
      engine running time;
      engine revolutions;
      engine or vehicle mileage; and/or time since the shut-off valve was previously opened and comparing the result to a predetermined threshold value.

9. The method according to claim 1, wherein determining whether the shut-off valve requires cleaning comprises:
determining an interval of time since the shut-off valve was previously cleaned and comparing the result to a predetermined threshold value.

10. The method according to claim 1, wherein determining whether the shut-off valve requires cleaning comprises:
sensing whether contaminants have built up within the shut-off valve.

11. A method of cleaning an engine inlet manifold throttle comprising:
determining whether throttle cleaning is requested;
adjusting throttle position so as to disturb any contaminants which have settled on the throttle; and
adjusting a position of a super aspirator shut-off valve to compensate for a change in flow of intake air through the throttle, the super aspirator shut-off valve selectively permitting a flow of intake air through an aspirator bypassing the throttle.

12. A system for cleaning a brake booster aspirator shut-off valve or a throttle of an engine, comprising:
the shut-off valve being operable to selectively permit flow of intake air through an aspirator, the aspirator bypassing the throttle of the engine and providing a vacuum source for a brake booster,
one or more controllers including executable instructions stored in memory for:
determining whether the shut-off valve requires cleaning;
at least partially opening the shut-off valve so as to permit a flow of air through the shut-off valve and clean the shut-off valve; and
adjusting the throttle position of the engine to compensate for additional flow of intake air through the aspirator.

13. The system according to claim 12, wherein the system further comprises one or more sensors configured to sense whether contaminants have built up within the shut-off valve and/or the throttle of the engine.

14. The system of claim 12, the one or more controllers further comprising instructions for:
shutting the shut-off valve and returning the throttle to its unadjusted position;
wherein the opening and shutting of the shut-off valve, together with the corresponding adjustment to the throttle position, is repeated.

15. The system of claim 12, the one or more controllers further comprising instructions for:
adjusting the throttle position to compensate for the additional flow of intake air through the aspirator in order to maintain a constant inlet manifold pressure; and
adjusting the throttle position to compensate for the additional flow of intake air through the aspirator in order to maintain a constant engine torque.

16. The system of claim 12, the one or more controllers further comprising instructions for:
determining an interval of time since the shut-off valve was previously cleaned and comparing the result to a predetermined threshold value; and
sensing whether contaminants have built up within the aspirator shut-off valve.

17. The system of claim 12, the one or more controllers further comprising instructions for:
determining whether the throttle requires cleaning;
adjusting the position of the throttle so as to disturb any contaminants which have settled on the throttle; and
adjusting a position of a super aspirator shut-off valve to compensate for a change in flow of intake air through the throttle, the super aspirator shut-off valve selectively permitting the flow of intake air through the aspirator bypassing the throttle.

18. The method according to claim 8, wherein determining whether the shut-off valve requires cleaning further comprises:
determining an interval of time since the shut-off valve was previously cleaned and comparing the result to a predetermined threshold value.

19. The method according to claim 9, wherein determining whether the shut-off valve requires cleaning further comprises:
sensing whether contaminants have built up within the shut-off valve.

20. The method of claim 11, wherein determining whether the throttle cleaning is requested includes determining a time since the throttle was previously opened and comparing the result to a predetermined threshold value, where the time since the throttle was previously opened is determined with respect to a determined interval of:
engine running time;
engine revolutions; and/or
engine or vehicle mileage.

* * * * *